(12) United States Patent
Rajkotia

(10) Patent No.: US 8,081,724 B2
(45) Date of Patent: Dec. 20, 2011

(54) WIRELESS NETWORK AND WIRELESS ACCESS TERMINALS USING SYNC_ID HAVING INCREASED GRANULARITY

(75) Inventor: Purva R. Rajkotia, Plano, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 966 days.

(21) Appl. No.: 10/966,875

(22) Filed: Oct. 15, 2004

(65) Prior Publication Data

US 2005/0124361 A1   Jun. 9, 2005

Related U.S. Application Data

(60) Provisional application No. 60/527,230, filed on Dec. 5, 2003.

(51) Int. Cl.
*H04L 7/00* (2006.01)

(52) U.S. Cl. ..... 375/356; 375/141; 375/149; 455/422.1; 370/338

(58) Field of Classification Search .......... 455/403, 455/414.1–414.2, 422.1, 429–430, 244.1, 455/436–444, 427, 130, 230, 232.1, 234.1, 455/239.1; 375/316, 346, 354, 356, 377, 375/130, 140–141, 145, 149, 147; 370/338, 370/310, 328–331

See application file for complete search history.

(56) References Cited

U.S. PATENT DOCUMENTS

| | | | |
|---|---|---|---|
| 5,943,332 A * | 8/1999 | Liu et al. | 370/342 |
| 2001/0030953 A1* | 10/2001 | Chang | 370/331 |
| 2002/0142757 A1* | 10/2002 | Leung et al. | 455/412 |
| 2002/0159416 A1* | 10/2002 | Kazmi et al. | 370/335 |
| 2002/0172262 A1* | 11/2002 | Sugaya et al. | 375/130 |
| 2003/0148786 A1* | 8/2003 | Cooper et al. | 455/552 |
| 2004/0179492 A1* | 9/2004 | Zhang et al. | 370/331 |
| 2004/0258022 A1* | 12/2004 | Julka et al. | 370/331 |

* cited by examiner

*Primary Examiner* — David C. Payne
*Assistant Examiner* — James M Perez

(57) ABSTRACT

A wireless network comprising a plurality of base station capable of communicating with a plurality of mobile station in a coverage area of the wireless network. A first base station transmits an enhanced synchronization identifier parameter to a mobile station. The enhanced synchronization identifier parameter may apply to less than all of the plurality of base stations defined by the System Identifier/Network Identifier (SID/NIC) value associated with the wireless network.

20 Claims, 2 Drawing Sheets

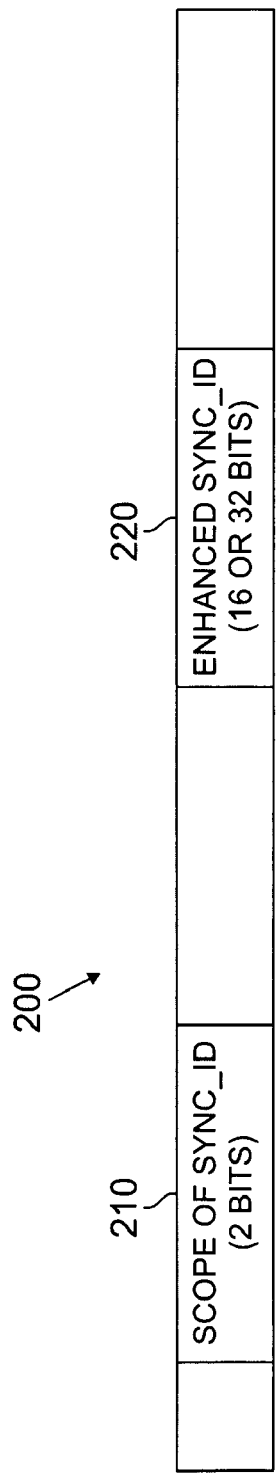

WIRELESS NETWORK AND WIRELESS ACCESS TERMINALS USING SYNC_ID HAVING INCREASED GRANULARITY

CROSS-REFERENCE TO RELATED APPLICATION AND CLAIM OF PRIORITY

The present invention is related to that disclosed in U.S. Provisional Patent Application Ser. No. 60/527,230, entitled "Wireless Networks and Wireless Access Terminals Using SYNC_ID Having Increased Granularity" and filed on Dec. 5, 2003. U.S. Provisional Patent Application Ser. No. 60/527,230 is assigned to the assignee of the present application. The subject matter disclosed in U.S. Provisional Patent Application Ser. No. 60/527,230 is hereby incorporated by reference into the present disclosure as if fully set forth herein. The present invention hereby claims priority under 35 U.S.C. §119(e) to U.S. Provisional Patent Application Ser. No. 60/527,230.

TECHNICAL FIELD OF THE INVENTION

The present invention generally relates to wireless networks and, more specifically, to CDMA2000 base stations and wireless terminals that use a synchronization identifier (SYNC_ID) parameter having granularity beyond the system identifier (SID) or network identifier (NID) boundary.

BACKGROUND OF THE INVENTION

Businesses and consumers use a wide variety of fixed and mobile wireless terminals, including cell phones, pagers, Personal Communication Services (PCS) systems, and fixed wireless access devices (i.e., vending machine with cellular capability). Wireless service providers create new markets for wireless devices and expand existing markets by making wireless devices and services cheaper and more reliable. Wireless service providers accomplish this, in part, by implementing new services, including digital data services that provide web browsing and e-mail capabilities.

Providing a fast call set-up is a critical requirement of many digital services. A fast call set-up also improves the quality of conventional voice services. Code division multiple access (CDMA) wireless network use a control channel parameter called the synchronization identifier (SYNC_ID) to provide fast call set-up operations. The SYNC_ID parameter is a variable length, signature code generated from the Service Configuration (SCR) parameter and the Non-Negotiable Service Configuration (NNSCR) parameter.

A base station of the wireless network specifies the length of the SYNC_ID parameter to a mobile station (e.g., a cell phone or other wireless access terminal). The SYNC_ID parameter defines certain operating parameters, such as modulation scheme (e.g., BPSK, QPSK, 16 QAM), coding rate, and the like. CDMA networks use the SYNC_ID parameter to reduce the negotiation time between the mobile station and the base station during a call set-up operation. Without the SYNC_ID parameter, a call set-up procedure may require anywhere from an extra few hundred milliseconds up to several extra seconds.

However, the generation of signature codes is not standardized among base station vendors. Each base station vendor generates its own signature code. Thus, it is possible for two identical signature codes from two different vendors to map to two different configurations.

The current approach to using the SYNC_ID parameter is problematic. As noted, the SYNC_ID parameter is a variable-length signature code generated using the SCR parameter and the NNSCR parameter. In conventional wireless networks, the scope of the SYNC_ID parameter is limited to the System Identifier (SID) or Network Identifier (NID) boundary. In other words, the value of the SYNC_ID parameter remains the same everywhere within the SID-NID boundary. Since the granularity of the SYNC_ID parameter is no finer than the SID-NID boundary, the usefulness of the SYNC_ID parameter is limited.

For example, a wireless network operator frequently uses the same base station controller (BSC) to serve both a downtown area and a rural area. However, the wireless network operator might choose to deploy data packet services in one configuration in the downtown area and in a very different configuration in the rural area. Using a common SYNC_ID parameter forces the wireless network operator to use the common BSC configuration. Also, there are situations in which two different packet control function (PCF) zones may lie within the same SID-NID boundary. This requires two different SYNC_ID parameters within the SID-NID region.

Therefore, there is a need in the art for improved wireless networks and improved wireless terminals for accessing the wireless networks. In particular, there is a need for CDMA2000 wireless network base stations and wireless mobile stations that use a SYNC_ID parameter that does not limit the BSC configuration of the wireless network.

SUMMARY OF THE INVENTION

The present invention overcomes the shortcomings of conventional wireless networks by providing CDMA2000 wireless network base stations and wireless mobile stations that use a SYNC_ID parameter having granularity beyond the SID/NID boundary To address the above-discussed deficiencies of the prior art, it is a primary object of the present invention to provide, for use in a wireless network comprising a plurality of base station capable of communicating with a plurality of mobile station in a coverage area of the wireless network, a first base station capable of transmitting an enhanced synchronization identifier parameter to a mobile station. The enhanced synchronization identifier parameter may apply to less than all of the plurality of base stations defined by the System Identifier/Network Identifier (SID/NIC) value associated with the wireless network.

According to one embodiment of the present invention, the base station transmits the enhanced synchronization identifier parameter and a control field indicating the scope of the enhanced synchronization identifier parameter.

According to another embodiment of the present invention, the control field indicates that the enhanced synchronization identifier parameter applies to the first base station.

According to still another embodiment of the present invention, the enhanced synchronization identifier parameter comprises a base station identifier value.

According to yet another embodiment of the present invention, the control field indicates that the enhanced synchronization identifier parameter applies to a group of base stations associated with a particular packet control function unit.

According to a further embodiment of the present invention, the enhanced synchronization identifier parameter comprises a packet control function zone identifier value.

According to a still further embodiment of the present invention, the wireless network comprises a CDMA2000 network.

According to a yet further embodiment of the present invention, the base station transmits the enhanced synchronization identifier parameter and the control field in at least one of: i) an Extended Channel Assignment message, ii) a Universal Hand-off Direction message, and iii) a Service Connect message.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts:

FIG. 2 illustrates an exemplary control message that implements an enhanced SYNC_ID parameter having increased granularity according to the principles of the present invention; and FIG. 3 illustrates exemplary values of the Scope of SYNC_ID field in FIG. 2 according to one embodiment of the present invention.

DETAILED DESCRIPTION OF THE INVENTION

Figure 1:
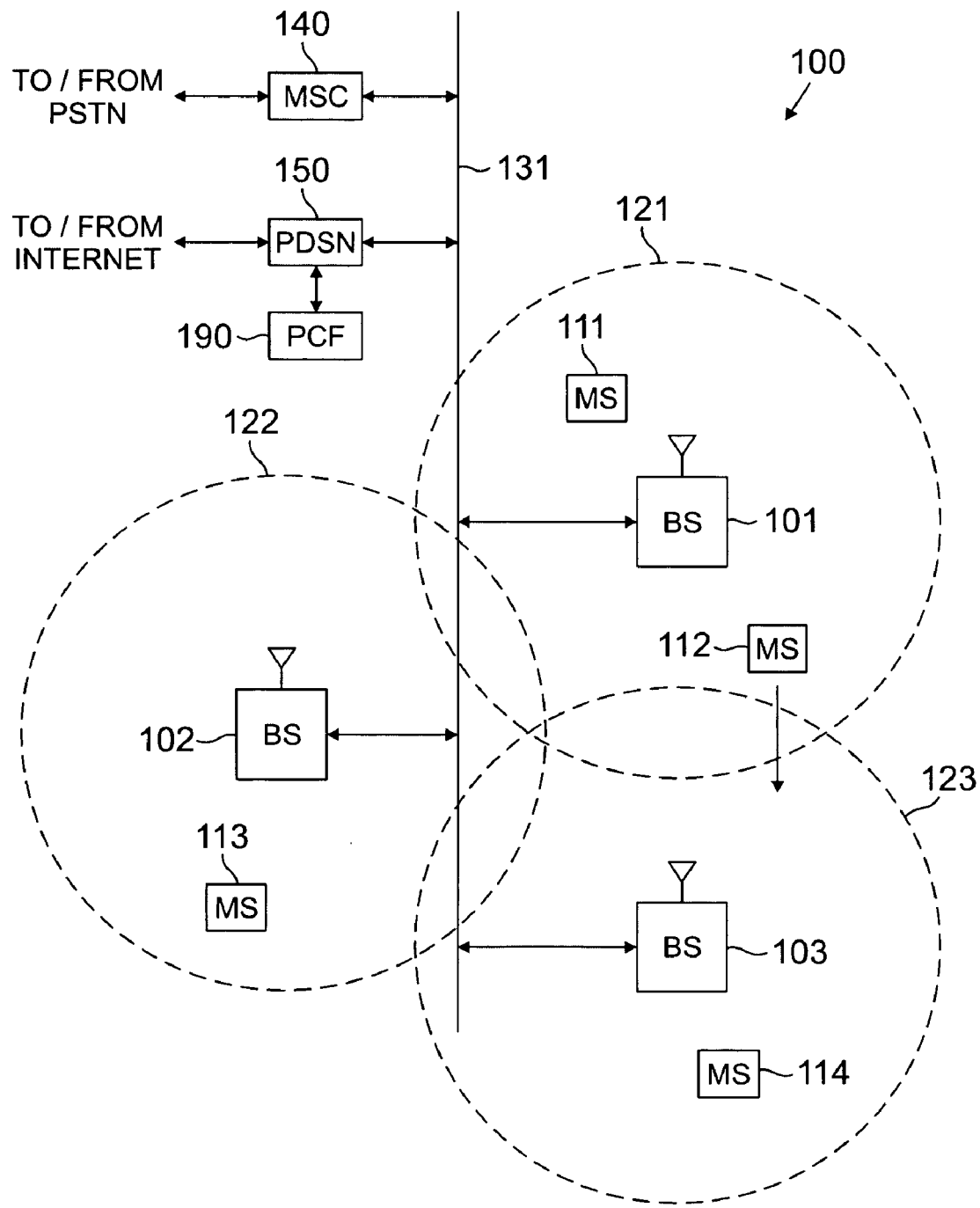
FIG. 1 illustrates an exemplary wireless network, which uses an enhanced SYNC_ID parameter having increased granularity according to the principles of the present invention.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

FIG. 1 illustrates exemplary wireless network 100, which uses an enhanced SYNC_ID parameter having increased granularity according to the principles of the present invention. Wireless network 100 comprises a plurality of cell sites 121-123, each containing one of the base stations, BS 101, BS 102, or BS 103. Base stations 101-103 communicate with a plurality of mobile stations (MS) 111-114 over code division multiple access (CDMA) channels according to the IS-2000-C standard (i.e., Release C of cdma2000) Mobile stations 111-114 may be any suitable wireless devices, including conventional cellular radiotelephones, PCS handset devices, personal digital assistants, portable computers, telemetry devices, and the like, which are capable of communicating with the base stations via wireless links.

The present invention is not limited to mobile devices. Other types of wireless access terminals, including fixed wireless terminals, may be used. For the sake of simplicity, only mobile stations are shown and discussed hereafter. However, it should be understood that the use of the term "mobile station" in the claims and in the description below is intended to encompass both truly mobile devices (e.g., cell phones, wireless laptops) and stationary wireless terminals (e.g., monitoring devices with wireless capability).

Dotted lines show the approximate boundaries of the cell sites 121-123 in which base stations 101-103 are located. The cell sites are shown approximately circular for the purposes of illustration and explanation only. It should be clearly understood that the cell sites may have other irregular shapes, depending on the cell configuration selected and natural and man-made obstructions.

As is well known in the art, cell sites 121-123 are comprised of a plurality of sectors (not shown), where a directional antenna coupled to the base station illuminates each sector. The embodiment of FIG. 1 illustrates the base station in the center of the cell. Alternate embodiments position the directional antennas in corners of the sectors. The system of the present invention is not limited to any particular cell site configuration.

In one embodiment of the present invention, BS 101, BS 102, and BS 103 comprise a base station controller (BSC) and at least one base transceiver subsystem (BTS). Base station controllers and base transceiver subsystems are well known to those skilled in the art. A base station controller is a device that manages wireless communications resources, including the base transceiver subsystems, for specified cells within a wireless communications network. A base transceiver subsystem comprises the RF transceivers, antennas, and other electrical equipment located in each cell site. This equipment may include air conditioning units, heating units, electrical supplies, telephone line interfaces and RF transmitters and RF receivers. For the purpose of simplicity and clarity in explaining the operation of the present invention, the base transceiver subsystem in each of cells 121, 122 and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center (MSC) 140. BS 101, BS 102 and BS 103 also transfer data signals, such as packet data, with the Internet (not shown) via communication line 131 and packet data server node (PDSN) 150. Packet control function (PCF) unit 190 controls the flow of data packets between base stations 101-103 and PDSN 150. PCF unit 190 may be implemented as part of PDSN 150, as part of base stations 101-103, or as a stand-alone device that communicates with PDSN 150, as shown in FIG. 1. Line 131 also provides the connection path to transfer control signals between MSC 140 and BS 101, BS 102 and BS 103 used to establish connections for voice and data circuits between MSC 140 and BS 101, BS 102 and BS 103.

Communication line 131 may be any suitable connection means, including a T1 line, a T3 line, a fiber optic link, or any other type of data connection. The connections on line 131 may transmit analog voice signals or digital voice signals in pulse code modulated (PCM) format, Internet Protocol (IP) format, asynchronous transfer mode (ATM) format, or the like. According to an advantageous embodiment of the present invention, line 131 also provides an Internet Protocol (IP) connection that transfers data packets between the base stations of wireless network 100, including BS 101, BS 102 and BS 103. Thus, line 131 comprises a local area network (LAN) that provides direct IP connections between base stations without using PDSN 150.

MSC 140 is a switching device that provides services and coordination between the subscribers in a wireless network and external networks, such as the PSTN or Internet. MSC 140 is well known to those skilled in the art. In some embodiments of the present invention, communications line 131 may be several different data links where each data link couples one of BS 101, BS 102 or BS 103 to MSC 140.

In the embodiment of wireless network 100 shown in FIG. 1, MS 111 and MS 112 are located in cell site 121 and communicate with BS 101. MS 113 is located in cell site 122 and communicates with BS 102 and MS 114 is located in cell site 123 and communicates with BS 103. MS 112 is located close to the edge of cell site 123 and moves in the direction of cell site 123, as indicated by the direction arrow proximate MS 112. At some point, as MS 112 moves into cell site 123 and out of cell site 121, a handoff will occur.

As is well known to those skilled in the art, the handoff procedure transfers control of a call from a first cell to a second cell. A handoff may be either a soft handoff or a hard handoff. In a soft handoff, a connection is made between the mobile station and the base station in the second cell before the existing connection is broken between the mobile station and the base station in the first cell. In a hard handoff, the existing connection between the mobile station and the base station in the first cell is broken before a new connection is made between the mobile station and the base station in the second cell.

As MS 112 moves from cell 121 to cell 123, MS 112 detects the pilot signal from BS 103 and sends a Pilot Strength Measurement Message to BS 101. When the strength of the pilot transmitted by BS 103 and received and reported by MS 112 exceeds a threshold, BS 101 initiates a soft handoff process by signaling the target BS 103 that a handoff is required as described in TIA/EIA IS-95 or TIA/EIA IS-2000.

BS 103 and MS 112 proceed to negotiate establishment of a communications link in the CDMA channel. Following establishment of the communications link between BS 103 and MS 112, MS 112 communicates with both BS 101 and BS 103 in a soft handoff mode. Those acquainted with the art will recognize that soft hand-off improves the performance on both forward (BS to MS) channel and reverse (MS to BS) channel links. When the signal from BS 101 falls below a predetermined signal strength threshold, MS 112 may then drop the link with BS 101 and only receive signals from BS 103. The call is thereby seamlessly transferred from BS 101 to BS 103. The above-described soft handoff assumes the mobile station is in a voice or data call. An idle handoff is the hand-off between cell sites of a mobile station that is communicating in the control or paging channel.

Wireless network 100 and the mobile stations accessing wireless network 100 use improved SYNC_ID parameters having enhanced granularity according to the principles of the present invention. The present invention increases the scope and usefulness of the synchronization identifier. In particular, the scope may be increased to include the Base_ID value, the PCF Zone ID value, and the like.

In conventional wireless networks, the SYNC_ID parameter is assigned to the mobile station by the base station (BS) in the Extended Channel Assignment message (ECAM), the Universal Hand-off Direction message (UHDM), or the Service Connect message (SCM). According to the principles of the present invention, when the base station assigns the SYNC_ID parameter, additional fields may be added to the SYNC_ID parameter in the above-mentioned messages to augment the scope of the SYNC_ID parameter.

FIG. 2 illustrates exemplary control message 200, which implements an enhanced SYNC_ID parameter having increased granularity according to the principles of the present invention. Control message 200 may represent, for example, an Extended Channel Assignment message (ECAM) 200, a Universal Hand-off Direction message (UHDM) 200, or a Service Connect message (SCM) 200. Control message 200 comprises, among other fields, Scope of SYNC_ID field 210 and Enhanced SYNC_ID field 220. In the exemplary embodiment, Scope of SYNC_ID field 210 comprises a 2-bit value and Enhanced SYNC_ID field 220 comprises a 16-bit or 32-bit value. The Scope of SYNC_ID field 210 defines how the value in the Enhanced SYNC_ID field is to be interpreted.

FIG. 3 illustrates exemplary values of Scope of SYNC_ID field 210 in FIG. 2 according to one embodiment of the present invention. If Scope of SYNC_ID field 210 contains [00], then the granularity of the synchronization identifier for wireless network 100 is the same as a conventional CDMA wireless network. In other words, the transmitting base station transmits a synchronization identifier (SYNC_ID) value that applies to all base stations within the System Identifier/Network Identifier (SID/NID) boundary. In this situation, Enhanced SYNC_ID field 220 may optionally be omitted.

If Scope of SYNC_ID field 210 contains [01], then Enhanced SYNC_ID field 220 contains a Base_ID value that applies to at least one base station, including the transmitting base station. If Scope of SYNC_ID field 210 contains [10], then Enhanced SYNC_ID field 220 contains a PCF Zone_ID value that applies to one or more base stations that are coupled to the same packet control function (PCF) unit 190. A binary value of [11] in Scope of SYNC_ID field 210 is reserved for future changes to the scope of the SYNC_ID value, if some other sort of granularity is required.

The SYNC_ID parameter is a very useful feature and will be used in practically all the data and the fast call set-up markets. Expanding the scope (i.e., increasing the granularity) of the SYNC_ID parameter makes this feature very attractive. The enhanced SYNC_ID parameter may be used to serve different kinds or classes of mobile stations within the same sector with the same efficiency. Advantageously, the present invention requires only very minimal changes to the control software of conventional base station and mobile stations. The present invention also has minimal impact on backwards compatibility of equipment.

Although the present invention has been described with an exemplary embodiment, various changes and modifications may be suggested to one skilled in the art.

What is claimed is:

1. A base station system for use in a wireless network, comprising
   a base station within a System Identifier/Network Identifier (SID/NID) boundary configured to transmit a variable enhanced synchronization identifier parameter and a control field to a mobile station, wherein said enhanced synchronization identifier parameter may apply to less than all of a plurality of base stations within the SID/NID boundary based on the enhanced synchronization identifier, wherein said control field indicates a scope of said enhanced synchronization identifier parameter, wherein said enhanced synchronization identifier parameter comprises a packet control function (PCF) zone identifier (PCF Zone_ID) value such that a control message comprising the enhanced synchronization identifier parameter applies to a group of base stations associated with a particular packet control function unit when the control field indicates that the selected scope of the enhanced synchronization identifier is a PCF granularity.

2. The base station as set forth in claim 1, wherein said enhanced synchronization identifier parameter applies to at least one base station, including said base station, when the control field indicates that the selected scope of the enhanced synchronization identifier is a base station identifier (Base_ID) granularity.

3. The base station as set forth in claim 2, wherein said enhanced synchronization identifier parameter comprises a base station identifier value when the selected scope of the enhanced synchronization identifier is the Base_ID granularity.

4. The base station as set forth in claim 1, wherein said wireless network comprises a CDMA2000 network.

5. The base station as set forth in claim 4, wherein said base station transmits said enhanced synchronization identifier parameter and said control field in an Extended Channel Assignment message.

6. The base station as set forth in claim 4, wherein said base station transmits said enhanced synchronization identifier parameter and said control field in a Universal Hand-off Direction message.

7. The base station as set forth in claim 4, wherein said base station transmits said enhanced synchronization identifier parameter and said control field in a Service Connect message.

8. A wireless network comprising:
a plurality of base stations within a System Identifier/Network Identifier (SID/NID) boundary, wherein said base stations are capable of communicating with a plurality of mobile stations in a coverage area of said wireless network, wherein at least one of the plurality of base stations is configured to transmit a variable enhanced synchronization identifier parameter and a control field to a mobile station, wherein said enhanced synchronization identifier parameter may apply to less than all of said plurality of base stations within the SID/NID boundary based on the enhanced synchronization identifier, wherein said control field indicates a scope of said enhanced synchronization identifier parameter, wherein said enhanced synchronization identifier parameter comprises a packet control function (PCF) zone identifier (PCF Zone_ID) value such that a control message comprising the enhanced synchronization identifier parameter applies to a group of base stations associated with a particular packet control function unit when the control field indicates that the selected scope of the enhanced synchronization identifier is a PCF granularity.

9. The wireless network as set forth in claim 8, said enhanced synchronization identifier parameter applies to said at least one base station, when the control field indicates that the selected scope of the enhanced synchronization identifier is a base station identification (Base_Id) granularity.

10. The wireless network as set forth in claim 9, wherein said enhanced synchronization identifier parameter comprises a base station identifier value when the selected scope of the enhanced synchronization identifier is the Base_ID granularity.

11. The wireless network as set forth in claim 8, wherein said wireless network comprises a CDMA2000 network.

12. The wireless network as set forth in claim 11, wherein said at least one base station transmits said enhanced synchronization identifier parameter and said control field in an Extended Channel Assignment message.

13. The wireless network as set forth in claim 11, wherein said at least one base station transmits said enhanced synchronization identifier parameter and said control field in a Universal Hand-off Direction message.

14. The wireless network as set forth in claim 11, wherein said at least one base station transmits said enhanced synchronization identifier parameter and said control field in a Service Connect message.

15. A mobile station capable of accessing a wireless network comprising a plurality of base stations within a System Identifier/Network Identifier (SID/NID) boundary, said mobile station comprising:
a transceiver configured to receive from a first one of said plurality of base stations a variable enhanced synchronization identifier parameter and a control parameter, wherein said mobile station uses said enhanced synchronization identifier parameter to access less than all of said plurality of base stations within the SID/NID boundary based on the enhanced synchronization identifier, wherein said control field indicates a scope of said enhanced synchronization identifier parameter, wherein said enhanced synchronization identifier comprises a packet control function (PCF) zone identifier (PCF Zone ID) value such that a control message comprising the enhanced synchronization identifier parameter applies to a group of base stations associated with a particular PCF unit when the control field indicates that the selected scope of the enhanced synchronization identifier is a PCF granularity.

16. The mobile station as set forth in claim 15, wherein said enhanced synchronization identifier parameter applies to at least one base station, including said first one of said plurality of base stations, when the control field indicates that the selected scope of the enhanced synchronization identifier is a base station identifier (Base_ID) granularity.

17. The base station as set forth in claim 15, wherein said mobile station receives the enhanced synchronization identifier parameter and the control field in a Service Connect message from one of said plurality of base stations.

18. The mobile station as set forth in claim 15, wherein said wireless network comprises a CDMA2000 network.

19. The mobile station as set forth in claim 15, wherein the mobile station receives said enhanced synchronization identifier parameter and said control field in a Universal Hand-off Direction message from one of said plurality of base stations.

20. The mobile station as set forth in claim 15, wherein the mobile station receives said enhanced synchronization identifier parameter and said control field in an Extended Channel Assignment message from one of said plurality of base stations.

* * * * *